R. H. GOLDSTEIN.
STAGE APPARATUS.
APPLICATION FILED OCT. 16, 1916.

1,223,488.

Patented Apr. 24, 1917.

Inventor
Robert H. Goldstein,
by James T. [signature]
his Attorney.

UNITED STATES PATENT OFFICE.

ROBERT H. GOLDSTEIN, OF LOS ANGELES, CALIFORNIA.

STAGE APPARATUS.

1,223,488. Specification of Letters Patent. Patented Apr. 24, 1917.

Application filed October 16, 1916. Serial No. 125,811.

*To all whom it may concern:*

Be it known that I, ROBERT H. GOLDSTEIN, a citizen of the United States, residing at Los Angeles, in the county of Los Angeles, State of California, have invented new and useful Improvements in Stage Apparatus, of which the following is a specification.

This invention relates to apparatus for producing stage effects by the use of mirrors; and it is the object of the invention to provide an apparatus for producing a novel and spectacular effect with a simple and easily constructed and arranged means.

My invention has in view the making of a stage effect particularly for motion pictures; the effect being recorded upon a motion picture film; but the invention is not necessarily limited to motion pictures.

I employ a central camera station, preferably concealed and preferably rotatable; and I arrange a plurality of mirrors (preferably plain mirrors, standing vertically) around the central camera station, with their reflective surfaces facing the station, and the mirrors substantially surrounding or inclosing a stage space in which an action may take place. As hereinafter described, the multiple reflections from the mirrors, together with the relative rotation of the camera station, give an effective multiplication of the action, so that a single action seems to be a great many times multiplied.

Figure 1:
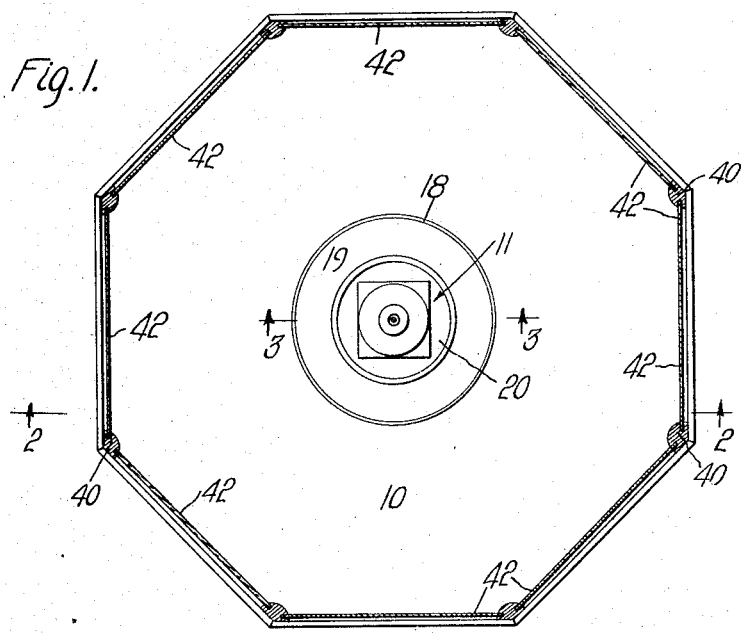
Figure 2:
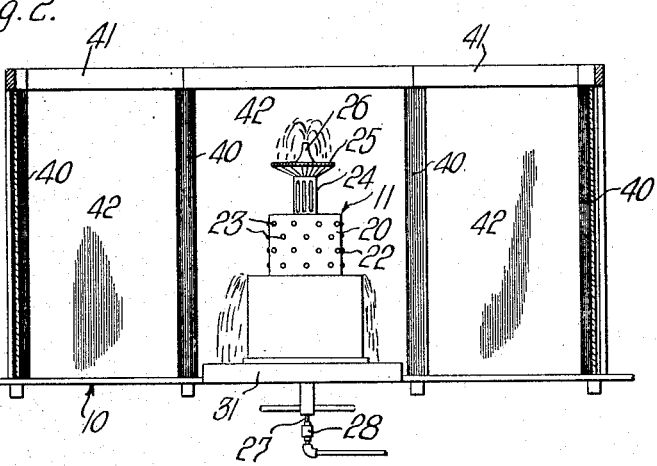
Figure 3:
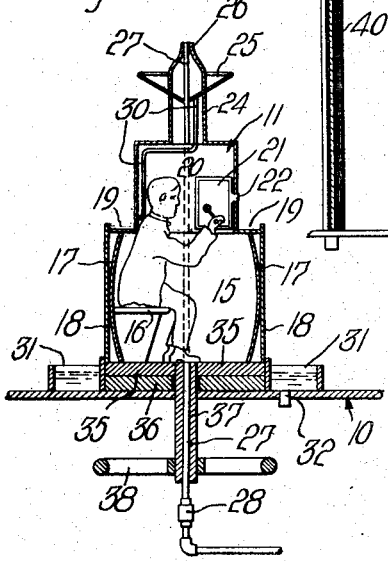

My invention will be more clearly apparent from the following description of a specific preferred form of apparatus, reference being had to the accompanying drawings in which, Figure 1 is a plan section of a preferred form of apparatus; Fig. 2 is a vertical section taken as indicated by line 2—2 on Fig. 1, and Fig. 3 is an enlarged vertical section taken as indicated by line 3—3 on Fig. 1.

In the drawings the numeral 10 designates a stage floor or any other suitable support upon which my apparatus may be erected and below which certain parts of the apparatus may be arranged, as hereinafter described.

I provide a central camera station 11, which may be of any desired character, but is preferably concealed by being ornamented or covered in some manner. For instance, I may provide a structure embodying a lower compartment 15, preferably circular and of a size adapted to receive a camera operator, a seat 16 being provided for that purpose. This compartment 15 may be easily constructed by using a barrel 17, which forms a strong support for the parts above. The barrel is surrounded by any suitable covering 18, this covering in this particular case forming the lower part of a fountain structure, being provided at its upper end with a basin 19 for reception of water which flows over the edge as indicated in Fig. 2. Rising from the upper end of the barrel there is a camera compartment 20 in which the motion picture or other camera 21 is placed, the lens of the camera projecting at 22. The exterior of this part 20 may be ornamented as indicated at 23, in any suitable manner, preferably in such a manner that the projecting camera lens (or the camera opening through the wall of the chamber 20) becomes unnoticeable. Above the part 20 I may provide a column 24, supporting a fountain basin 25, and a fountain nozzle 26. Water is supplied to the fountain nozzle through a pipe 27 which extends up through the stage floor 10 and may have a swivel joint 28 on its lower part. The water which falls into basin 25 is carried by pipe 30 to the water basin 19 and thence falls over the part 18 into the water basin 31 below. From the water basin 31 the water may be withdrawn in any suitable manner, as by withdrawing a plug 32.

The barrel 17 and the structure supported thereby is carried upon a turn table 35 which rests upon a turn table base 36 and is rotatable thereon. A hollow shaft 37 connects with turn table 35 and projects below the stage floor and is there provided with a hand wheel 38, or provided with any other suitable means for causing rotation. The turn table 35 and turn table base 36 may be of any suitable character; being, in a simple form of apparatus, merely two plates or disks, with a charge of grease between them.

Surrounding the central camera station, I provide a frame work made up of pillars 40 and horizontal frame pieces 41. Mirrors 42 are carried in this frame work between the pillars; and the pillars are preferably ornamented in some suitable manner. The ornamentation may be made to conform to the scene to be enacted in the stage space inclosed by the mirrors. The size and number of the mirrors depends largely upon the effect desired and upon the amount of space required for action. In an ordinary case the distance across the inclosed stage space may be some 30 or 40 feet; and the mirrors may be eight in number, as illustrated, or may be of any suitable number. I preferably use plain mirrors placed in the manner shown, each mirror facing the camera station squarely; but it will be seen that it is not necessary to place the mirrors in said specific position, nor to use plain mirrors. If grotesque effects are desired, the mirrors may be of various forms to distort the images.

The use and operation of my apparatus is extremely simple. The stage having been set in the inclosed space, the action is carried on, the camera station is revolved at any suitable speed, and the reflected scene is recorded by the camera, together with whatever direct views the camera may take of the action. The apparatus is particularly effective for taking certain kinds of action; as, for instance, the marching of soldiers, dancing scenes and the like. For instance, a few dancers stationed in the stage space are recorded upon the camera film many hundreds or thousands of times by reflection. The image of the original actor is reflected back and forth from mirror to mirror and finally to the camera; and the camera thus records a great number of images of each single actor or object. Rotation of the camera station has the effect of continuously changing and varying the scene. For instance, at one point, the camera may record, from a few dancers, an innumerable number of images; the scene seemingly stretching away indefinitely into the distance. While, at another point, the camera may record a similar set of images of quite a different scene; or the camera may record intermingled images of the different scenes.

Many uses of this apparatus will suggest themselves to those skilled in this art and I therefore do not attempt to specify the uses to which the apparatus may be put, nor to limit myself to any particular uses. Furthermore, in order to suit different uses and different situations, various changes may be made in the apparatus; but I do not limit my invention from such changes, except as appear from the following claims.

Having described a preferred form of my invention, I claim:

1. Stage apparatus of the character described, embodying a plurality of inwardly facing mirrors arranged about a stage space, and a concealed camera station within said space.

2. Stage apparatus of the character described, embodying a plurality of inwardly facing mirrors arranged about a center and inclosing a stage space, a concealed camera station within said space, and means to cause relative rotation of the mirrors and camera station.

3. Stage apparatus of the character described, embodying a plurality of inwardly facing mirrors arranged about a center and inclosing a stage space, and a rotatable concealed camera station within said space.

4. Stage apparatus of the character described, embodying a central rotatable camera station, and a plurality of upright mirrors arranged around the camera station inclosing a stage space therearound.

5. Stage apparatus of the character described, embodying a central rotatable concealed camera station, and a plurality of upright mirrors arranged around the camera station inclosing a stage space therearound in which space an action may take place, the mirrors reflecting inwardly toward the camera station.

6. Stage apparatus of the character described embodying a plurality of inwardly facing mirrors arranged about a stage space, a camera station within said space, and means to cause relative rotation of the mirrors and camera station.

In witness that I claim the foregoing I have hereunto subscribed my name this 11th day of October 1916.

ROBERT H. GOLDSTEIN.

Copies of this patent may be obtained for five cents each, by addressing the "Commissioner of Patents, Washington, D. C."